(12) United States Patent
Bone

(10) Patent No.: US 9,028,184 B2
(45) Date of Patent: May 12, 2015

(54) PROTRUSION ANCHOR ASSEMBLY

(71) Applicant: Dennis Bone, Tewksbury, MA (US)

(72) Inventor: Dennis Bone, Tewksbury, MA (US)

( * ) Notice: Subject to any disclaimer, the term of this patent is extended or adjusted under 35 U.S.C. 154(b) by 0 days.

(21) Appl. No.: 14/056,384

(22) Filed: Oct. 17, 2013

(65) Prior Publication Data

US 2014/0112731 A1   Apr. 24, 2014

Related U.S. Application Data

(60) Provisional application No. 61/715,893, filed on Oct. 19, 2012.

(51) Int. Cl.
F16B 13/04 (2006.01)
F16B 21/12 (2006.01)
F16B 13/08 (2006.01)

(52) U.S. Cl.
CPC ............ *F16B 21/12* (2013.01); *F16B 13/0833* (2013.01)

(58) Field of Classification Search
USPC ........ 411/21, 44, 45, 71, 80.6, 271, 337, 348, 411/549, 555; 279/2.23; 292/252
See application file for complete search history.

(56) References Cited

U.S. PATENT DOCUMENTS

| 431,259 | A | * | 7/1890 | Emrich | 411/21 |
| 2,373,083 | A | * | 4/1945 | Brewster | 411/348 |
| 2,685,877 | A | * | 8/1954 | Dobelle | 623/23.11 |
| 3,386,138 | A | * | 6/1968 | Overman | 411/383 |
| 3,943,817 | A | | 3/1976 | Mess | |
| 4,475,329 | A | | 10/1984 | Fischer | |
| 4,917,552 | A | * | 4/1990 | Crawford | 411/32 |
| 5,116,176 | A | | 5/1992 | Yousuke | |
| 5,221,167 | A | | 6/1993 | Girkin et al. | |
| 5,228,250 | A | | 7/1993 | Kesselman | |
| 5,394,594 | A | * | 3/1995 | Duran | 24/453 |
| 5,803,689 | A | * | 9/1998 | Magnus et al. | 411/355 |
| 6,893,184 | B2 | * | 5/2005 | Mills et al. | 403/322.2 |
| 7,165,924 | B1 | * | 1/2007 | Breslin et al. | 411/271 |
| 7,393,168 | B2 | * | 7/2008 | Wei | 411/21 |
| 2008/0056814 | A1 | * | 3/2008 | Klingenberg et al. | 403/322.2 |
| 2008/0152457 | A1 | * | 6/2008 | Schmier | 411/348 |

* cited by examiner

*Primary Examiner* — Roberta Delisle
(74) *Attorney, Agent, or Firm* — Daniel Boudwin; Global Intellectual Property Agency LLC

(57) ABSTRACT

A protrusion anchor assembly is provided that utilizes a plurality of extendable pins to secure the anchor body within a bore in any hard material, such as concrete. The anchor body is rotated within the bore while the pins are simultaneously and gradually extended, carving out a groove or grooves within which the pins can sit. After installation, the device is secured within the bore by tightening a jamb nut against the surface of the concrete wall and in some embodiments placing a security plug within the anchor body to ensure that the pins are held in place. The pins prevent the anchor from being withdrawn because they act as protuberances that catch against the edges of the groove and cannot be drawn past that point.

10 Claims, 5 Drawing Sheets

PROTRUSION ANCHOR ASSEMBLY

CROSS REFERENCE TO RELATED APPLICATION

This application claims the benefit of U.S. Provisional Application No. 61/715,893 filed on Oct. 19, 2012, entitled "Protrusion Concrete Anchor." The above identified patent application is herein incorporated by reference in its entirety to provide continuity of disclosure.

BACKGROUND OF THE INVENTION

1. Field of the Invention

The present invention relates to an anchoring device for fastening in a pre-drilled hole or recess in concrete or another substantially brittle material. Specifically, the present invention relates to expandable female material fasteners, which are designed to be inserted into a concrete bore and then expanded via the insertion of a complimentary threaded bolt or rod, wherein the device acts as an anchor in otherwise brittle concrete material.

The technology behind concrete anchors has changed little over time, but there is still room for improvement in this area. The basic idea behind most concrete fasteners is that they are placed within a pre-drilled bore in the concrete and are then expanded so that the fastener engages with the walls of the concrete and creates friction. This generated friction is what secures the fastener within the concrete and prevents it from moving. The differences among existing concrete fasteners relate mostly to the ways in which the fasteners are expanded once placed within the bore. The expansion is accomplished in many different ways and thus there are all types of concrete fasteners, such as wedge anchors, sleeve anchors, concrete screws, drop-in anchors, machine screw anchors, strikes anchors, hammer drive anchors, split drive anchors, and lag shields.

Many different types of concrete fasteners exist, but most utilize the same basic strategy of having a portion that is expanded by a rod or a wedge to engage against the walls of the bore. Other types of concrete fasteners utilize epoxy or some other type of bonding agent to secure a fastener within a concrete wall. However, both of the previous mechanical wedge and epoxy designs can lead to anchor slippage over time. For the mechanical wedge designs, the frictional force generated by the interaction between the anchor and the bore's walls is not sufficient to hold the anchor indefinitely. For the bonding agent designs, the chemicals can wear down over time, which renders the anchor useless.

The present invention provides a new and novel means for securing a fastener within a concrete bore. The present protrusion anchor assembly relies on the same basic idea of the mechanical wedge designs in increasing the volume of the fastener once it is placed within the pre-drilled bore. However, the present invention applies the principle in a different way. Rather than having separate portions that are pushed apart by a wedge or angled baffles that are pushed into the surrounding concrete, the present invention utilizes a plug to deploy a plurality of pins from the body of the anchor after it has been placed within the concrete bore. The pins are gradually deployed while the anchor body is simultaneously rotated, carving a groove or grooves out of the surrounding concrete bore. The fully extended pins rest within the grooves and cannot be pulled or pushed therefrom since the fully-extended pins create a larger cross-sectional area for the anchor than the cross-sectional area of the rest of the bore. Although the present protrusion anchor assembly is expansible, only a small portion of the device is expansible and no other such device cuts grooves into the surrounding bore to help secure the device.

2. Description of the Prior Art

Devices have been disclosed in the prior art that relate to concrete fasteners. These include devices that have been patented and published in patent application publications. These devices generally relate to female concrete anchors that are used with an inserted thread or bolt. The following is a list of devices deemed most relevant to the present disclosure, which are herein described for the purposes of highlighting and differentiating the unique aspects of the present invention, and further highlighting the drawbacks existing in the prior art.

One such device in the prior art is U.S. Pat. No. 3,943,817 to Mess, which discloses a split bolt used in combination with an insert. Mess has two segments with external threaded surfaces that are designed to radially space apart and engage with the complementary threaded insert member when a wedge portion is inserted between the segments. The wedge portion has multiple camming surfaces along its length that engage with corresponding surfaces on the internal face of the bolt segments, which creates a stronger wedge. Although both Mess and the present invention use insertable wedges to create an engagement between the concrete fastener and the concrete, Mess requires the bolt to be used to combination with an artificial threaded recess or bore, whereas the present concrete fastener directly engages with the concrete.

Another such device is U.S. Pat. No. 4,475,329 to Fischer, which discloses an expansible concrete anchor device with a bonding agent. The concrete anchor consists of a slotted portion with a central bore that is expanded to fit the hole into which it is inserted via the insertion of an expander pin. The central bore is then filled with the bonding agent, creating adhesion between the expander pin and the expansible anchor, in order to support the engagement between the walls of the expansible portion and the concrete. The present invention does not utilize any bonding agents and instead relies purely on mechanical force to generate the frictional force between the walls of the anchor and the concrete. Furthermore, the present device utilizes a security plug in order to ensure that the protrusion actuator is fully engaged after the anchor has been installed.

U.S. Pat. No. 4,917,552 to Crawford discloses a pin drive anchor device, whereby the anchor is inserted into a wall of a cavity and then a pin is driven through the central bore of the anchor to expand the sleeve portions so that they engage with the wall cavity. The present invention utilizes pins that extend into the surrounding concrete and carve out a portion in order to secure the anchor within the bore, rather than an expansible sleeve portion as in Crawford.

Another such device is U.S. Pat. No. 5,116,176 to Yousuke, which discloses an expansion anchor that is expanded by forcing a wedge plug through the central bore of the anchor. As the anchor expands, the peripheral angular edges of the anchor are forced into the surrounding material, preventing the anchor from being removable from the pre-drilled bore in the material. The present protrusion concrete anchor utilizes a plurality of pins that extend into the surrounding material in order to secure the anchor, rather than a peripheral angular edge. Furthermore, the present invention utilizes a security plug that may be installed into the anchor after the anchor has been secured within the concrete wall in order to keep the pins engaged with the surrounding concrete, regardless of the outside forces acting on the anchor.

Finally, U.S. Pat. No. 5,228,250 to Kesselman discloses a tamperproof anchor bolt device. Kesselman consists of a standard expandable anchoring means attached to a tamperproof nut assembly. The tamperproof nut assembly is designed such that when a pre-determined amount of torque is applied, the cap portion breaks off, leaving the anchor in its expanded position. The cap being broken off prevents the anchor from being removed and therefore prevents undesired tampering. The present invention is not specifically meant to address potential tampering, but is instead designed so that it is secured firmly enough that it cannot be easily removed by forces acting on the anchor, not other individuals.

The present invention provides an expandable concrete fastener device having three main portions. The anchor portion consists of an elongated, largely cylindrical body that has a plurality of pins that are driven into the surrounding rigid material by the protrusion actuator in order to secure the anchor therein. The anchor installation tool removably engages with the anchor portion and provides a rod for driving the protrusion actuator into the terminal end of the anchor portion and thereby extending the pins into the surrounding material. The security plug portion has a threaded end that engages with the complimentary threading in the anchor portion and an elongated rod portion that pushes against the protrusion actuator, thereby ensuring that the protrusion actuator remains locked in place. The anchor is placed into a pre-drilled bore within the concrete or other rigid material and then the installation tool rotates the entire anchor portion while extending the pins, thereby cutting a shelf in the surrounding concrete that secures the anchor within the bore.

It is submitted that the present invention substantially diverges in design elements from the prior art and consequently it is clear that there is a need in the art for an improvement to existing concrete fastener devices. In this regard the instant invention substantially fulfills these needs.

SUMMARY OF THE INVENTION

In view of the foregoing disadvantages inherent in the known types of expandable rigid material fasteners now present in the prior art, the present invention provides a new expandable fastener wherein the same can be utilized for providing convenience for the user when seeking to secure objects to concrete or other such rigid materials.

It is therefore an object of the present invention to provide a new and improved expandable fastener device that has all of the advantages of the prior art and none of the disadvantages.

It is another object of the present invention to provide an expandable fastener that cannot be pulled out from the material into which it is installed.

Another object of the present invention is to provide an expandable fastener that does not use epoxy or other binding agents, as such compounds are prone to deterioration over time.

Yet another object of the present invention is to provide an expandable fastener that can create a sufficient clamping force to hold the fastener in place merely by depressing the protrusion actuator and thereby deploying the pins.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
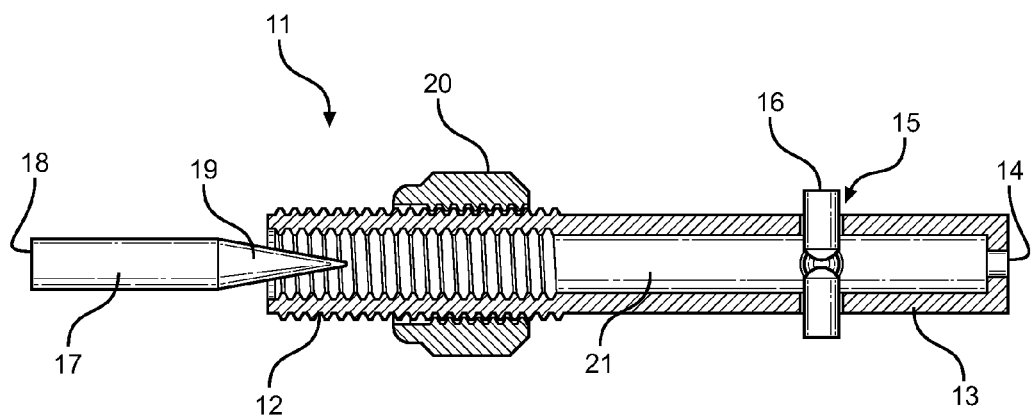
FIG. 1 shows a cross-sectional view of the anchor portion of the present protrusion anchor assembly.

Reference is made herein to the attached drawings. Like reference numerals are used throughout the drawings to depict like or similar elements of the protrusion anchor assembly. For the purposes of presenting a brief and clear description of the present invention, the preferred embodiment will be discussed as used for permanently installing the protrusion anchor assembly within a concrete wall. The figures are intended for representative purposes only and should not be considered to be limiting in any respect.

The present protrusion anchor assembly consists of three separate components, the anchor body, the anchor installation tool, and, in some embodiments, the security plug. In some embodiments, all three components are necessary to securely install the present fastener in a hard, rigid material such as concrete, whereas in other embodiments the present protrusion anchor assembly is comprised of merely the anchor body and the anchor installation tool. The present protrusion anchor assembly is installed within a pre-drilled bore in the concrete. The anchor body is placed within the bore and then the installation portion is removably secured to the end of the anchor body extending from the hole. The driver rod extending through the installation tool is then depressed, causing pins to extend from the terminal end of the anchor body while the anchor installation tool is rotated by a device such as an impact wrench, causing the pins to carve support grooves in the surrounding bore. The installation tool is then removed and, in some embodiments, the security plug is threadably inserted within the anchor body to hold it fast in place within the concrete.

Referring now to FIG. 1, there is shown a cross-sectional view of an embodiment of the anchor body 11 of the present invention. The anchor body 11 has an elongated, generally cylindrical body that has an upper threaded portion 12 and a lower portion 13. The anchor body 11 can be composed of any material sufficiently resilient to withstand the forces generated by objects fastened to the anchor body, but is preferably composed of Grade 8 steel. The anchor body 11 has an internal bore 21 extending therethrough, which is adapted to house the protrusion actuator 17. The protrusion actuator 17 has a smaller diameter than that of the internal bore 21 so that it can slide easily through the device. The internal bore 21 extends between an open hole at the upper threaded portion and an end cap hole 14 at the terminal end of the lower portion 13. The upper threaded portion 12 has both external and internal threading.

The protrusion actuator 17 has a driver end 18 and a tapered end 19. The protrusion actuator 17 is arranged such that the tapered end 19 points towards the terminal end of the lower portion 13 and, when fully depressed, the tip of the tapered end may extend partially through the end cap hole 14. The lower portion 13 further has a plurality of anchor holes 15 and a complimentary number of pins 16. The pins 16 can be arranged in either a single horizontally-aligned row or a plurality of horizontally-aligned rows. In the preferred embodiment, the pins 16 are arranged such that they are 90 degrees apart when measured radially. The pins 16 are composed of a material hard enough to withstand the forces exerted on the surrounding concrete, such as high carbon hardened steel. The pins 16 preferably have a diameter equal to the diameter of the anchor holes 15 so that they are able to slide tightly through the anchor holes 15 and preferably are made of cobalt steel. The inner end of the pins 16 is rounded and the outer end, which carves into the surrounding concrete during installation of the anchor body 11, is preferably flat.

The pins 16 are arranged such that outer ends are either below the plane of the anchor holes 15 or flush with the exterior outer wall of the lower portion 13, as long as they do not extend therefrom. Tape or another adhesive may optionally be disposed around the lower portion 13 across the anchor holes 15 in order to keep the outer ends of the pins 16 secured in place within the anchor holes 15. In either configuration, the pins 16 are configured such that when the protrusion actuator 17 is depressed, the tapered end 19 gradually pushes the pins 16 up out of the anchor holes 15, without completely pushing them out thereof. It is critical that the body of the pins 16 still remain at least partially within the anchor holes 15 so that the pins 16 can support the anchor body 11 after installation. The tapered end 19 of the protrusion actuator 17 is able to get under and then push up the pins 16 because the inner end of the pins 16 is rounded and therefore the tapered end 19 can slide under the pins 16. This allows the pins 16 to engage with the surrounding concrete without completely separating from the anchor body 11 and therefore still being able to support the anchor body 11.

The anchor body 11 is placed within the pre-drilled bore and then the anchor installation tool 41 is removably attached to the anchor body 11 via the internal threading of the upper threaded portion 12. The anchor installation tool 41 is designed to gradually depress the protrusion actuator 17 within the internal bore 21. As the protrusion actuator 17 is pushed through the internal bore 21 of the lower portion 13 towards the lower portion's 13 terminal end, the tapered end slides under any pins 16 with which it comes in contact. The pins 16 are then gradually forced through the anchor holes 15 into the surrounding concrete as the cross-sectional area of the tapered end 19 increases. The anchor installation tool 41 also rotates the anchor body 11 as the protrusion actuator 17 is depressed in order to carve out grooves in the concrete. When the protrusion actuator 17 is fully depressed, the base of the pins 16 rest against the protrusion actuator 17, preventing them from being pushed back into the anchor body 11.

The grooves carved out by the pins 16 therefore act as supports preventing the protrusion anchor assembly from being removed from the bore. After the anchor body 11 is installed within the bore, the jamb nut 20 is threadably engaged along the external threading of the upper threaded portion 12 and tightened until the jamb nut 20 is flush to the surface of the concrete, thereby mechanically securing the anchor between the protrusion pins 16 and the jamb nut 20.

Figure 2:
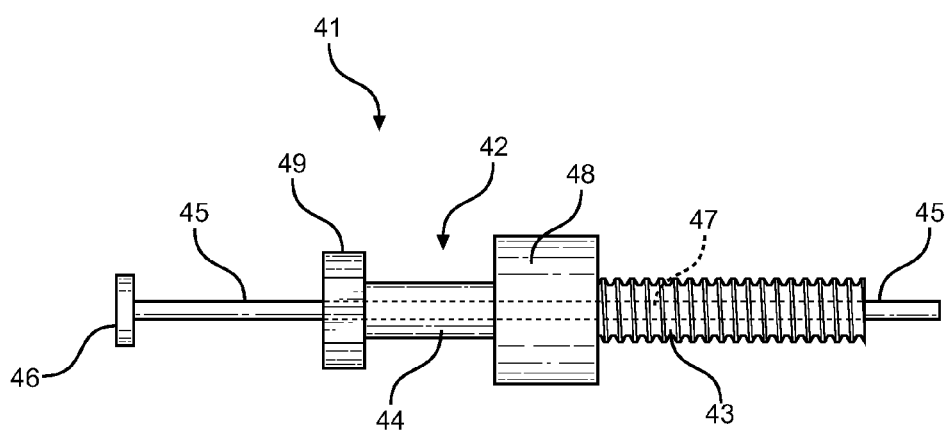
FIG. 2 shows a perspective view of the anchor installation portion of the present protrusion anchor assembly.

Referring now to FIG. 2, there is shown a perspective view of the anchor installation tool 41. The anchor installation tool 41 is generally cylindrical and consists of two portions: a body portion 42 and a driver rod 45. The anchor installation tool 41 may be made of a wide variety of metals, but is preferably comprised of Grade 8 steel. The body portion consists of an upper tool portion 44 and a lower tool threaded portion 43. The lower tool threaded portion 43 is adapted to engage with the internal threading of the upper threaded portion 12 of the anchor body 11. The body portion 42 has a channel through its entire length, which is adapted to permit the driver rod 45 to extend therethrough.

The anchor installation tool 41 is removably secured to the anchor body 11, which is placed within a pre-drilled hole in the concrete or other hard, rigid material. The two components are secured together via the lower threaded portion 43 of the anchor installation tool 41, which is removably screwed onto the internal threading of the upper threaded portion 12 of the anchor body 11. The driver rod 45 extends through the body portion 42 of the anchor installation tool 41, into the internal bore 21 of the anchor body 11, and presses against the driver end 18 of the protrusion actuator 17. The driver rod 45 has a pad 46 at its opposite end that prevents the driver rod 45 from being pushed all the way into the channel, making it irretrievable. The driver rod 45 is fully depressed once it comes in contact with the engagement means 49. The engagement means 49 is further used as a surface that can be used to drive the rotation of the anchor body 11, generally with an impact wrench, because the rotation from the anchor installation tool 41 is transferred to the anchor body 11 through the engagement of their threaded portions 12, 43. A block nut 48 rests between the upper tool portion 44 and the lower tool threaded portion 43 to prevent the anchor installation tool 41 from being pushed too deeply into the anchor body 11.

When the anchor installation tool 41 is secured in position on the anchor body 11, some type of driving means, such as an impact wrench, is attached to the engagement means 49 in order to rotate the entire protrusion anchor assembly while at the same time pressing the driver rod 45 inwards. The protrusion pins 16 extend out farther the more the driver rod 45 is depressed because of the tapered end 19 of the protrusion actuator 17. The tapered end 19 has a smaller circumferential area at its terminal end, which is the first part to come in contact with the pins 16, and said area gradually increases until it reaches the driver end 18. The deeper the driver rod 45 is pushed, the farther the protrusion actuator 17 is in turn pushed inward and therefore the circumferential area supporting the base of the pin 16 increases as the smaller area of the terminal end of the tapered end 19 goes past the inner end of the pins 16. The extended pins 16 then rotate within the bore, along with the rest of the assembly, carving out grooves within the bore. After a certain period of time the pins 16 are fully extended and the grooves are sufficiently carved. At that point, the jamb nut 20 is tightened against the surface of the concrete in order to secure the anchor body 11 between the jamb nut 20 and the pins 16 within the carved-out grooves. The amount of inward force exerted by the user onto the impact wrench determines how fast the protrusion pins 16 extend because the inward force pushes the driver rod 45, which in turn pushes the protrusion actuator 17 deeper into the internal bore 21. After the jamb nut 20 is secured, the anchor installation tool 41 may be removed by unthreading it from the upper threaded potion 12. After the anchor installation tool 41 is removed, it can be re-used to install multiple anchor bodies 11.

Figure 3:
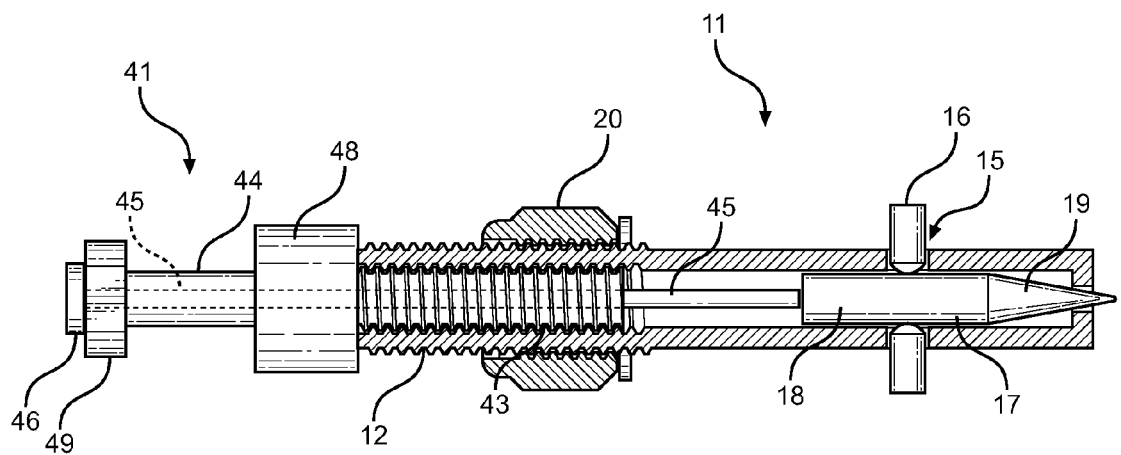
FIG. 3 shows a cross-sectional view of the installation portion and the anchor portions of the present protrusion anchor assembly engaged together, as they are during installation of the anchor portion into a bore within a rigid material.

Referring now to FIG. 3, there is shown a cross-sectional view of the anchor body 11 and the anchor installation tool 41 engaged together. The lower tool threaded portion 43 engages with the internal threading of the upper threaded portion 12 in order to secure the two components together. When the driver rod 45 is fully depressed, the pad 46 and the engagement means 49 are flush against each other, leaving the engagement means 49 free to be rotated by an impact wrench, or any other device that is capable of simultaneously keeping the pad 46 fully depressed and rotating the engagement means 49.

The jamb nut 20 and the pins 16 work in tandem to secure the anchor body 11 within the bore. The jamb nut 20 secures flush against the surface of the concrete in order to keep the anchor body 11 in position. The main element that keeps the present protrusion anchor assembly in position within the concrete is the pins 16, however. The pins 16 cannot retreat towards the inner axis of the anchor body 11 because their bases are supported by the fully depressed protrusion actuator 17, which holds them in place. The pins 16 also cannot move in response to a horizontally applied stress because they are held within the grooves that were carved by them as they were extended and rotated. Since the pins 16 cannot move and are integral with the rest of the present protrusion anchor body 11, they secure the entire anchor body 11 within the concrete bore.

Figure 4:
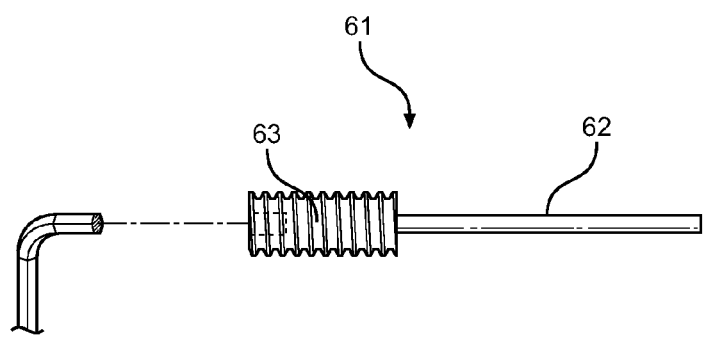
FIG. 4 shows a perspective view of the security plug portion of the present protrusion anchor assembly.
Figure 5:
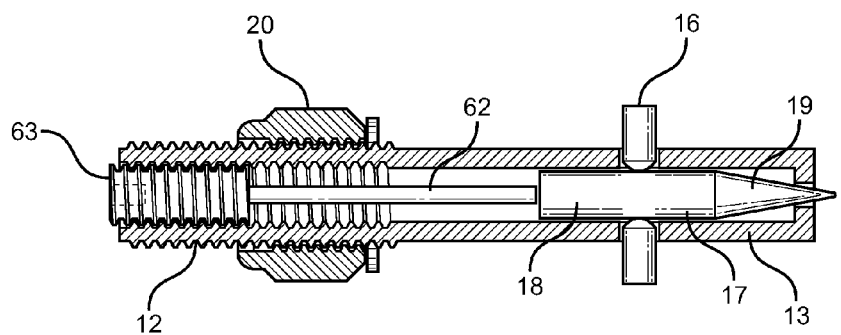
FIG. 5 shows a cross-sectional view of the security plug portion and the anchor portions of the present protrusion anchor assembly engaged together, as they are after installation of the anchor portion into a bore within a rigid material.

Referring now to FIGS. 4 and 5, there is shown, respectively, a perspective view of the security plug 61 and the security plug 61 engaged with the anchor body 11. The security plug 61 consists of two components, the threaded plug portion 63 that is connected to the elongated rod portion 62. The threaded plug portion 63 is adapted to be able to engage with the internal threading of the upper threaded portion 12 of the anchor body 11, just like the lower tool threaded portion 43 of the anchor installation tool 41. The elongated rod portion 62 is long enough such that it holds the protrusion actuator 17 in place pressed against the terminal end of the internal bore 21 when the threaded plug portion 63 is fully threadably engaged with the internal thread of the upper threaded portion 12.

The security plug 61 is necessary in this embodiment because when the anchor installation tool 41 is removed, there is nothing securing the protrusion actuator 17 in place. If the protrusion actuator 17 could move, then there would be nothing securing the protrusion pins 16 in place. If there was nothing keep the protrusion pins 16 in place, then a sufficient force could rip the anchor body 11 from the bore because the pins 16 are the primary securing element. Therefore, the security plug 61 is attached to the anchor body 11 after the anchor installation device 41 has been removed to keep the entire assembly in place and fully secured.

Figure 6:
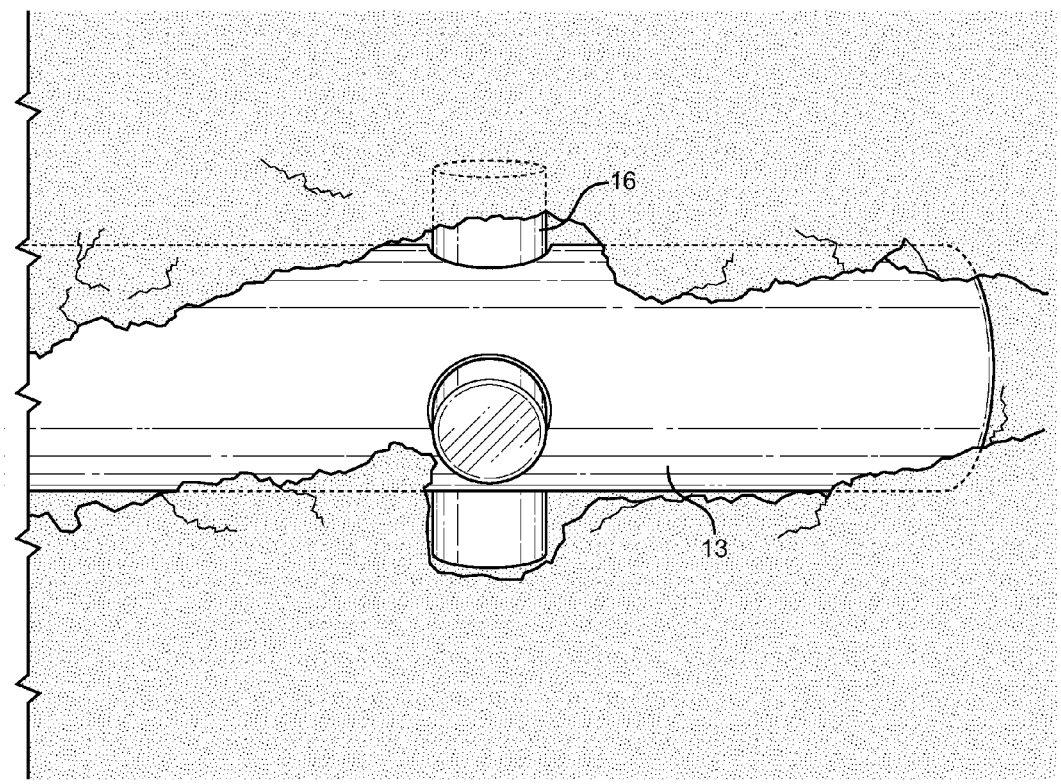
FIG. 6 shows a cut-away view of the terminal end of the anchor portion of the present protrusion anchor assembly, demonstrating how the pin portions carve out a section of the concrete to act as a shelf against which the anchor may be supported.

Referring now to FIG. 6, there is shown a close-up cutaway view of the lower portion 13 of the anchor body 11 after it has been installed within a pre-drilled bore in concrete. The pins 16 are horizontally-aligned such that each set of pins 16 works in tandem to carve out a single groove within the bore around the anchor body 11. Once the grooves are sufficiently carved out via the simultaneous depressing and rotating motions of the anchor installation tool 41, and the security plug 61 is inserted, the pins 16 prevent the anchor body 11 from being removed from the bore because they are supported in their fully extended position by the protrusion actuator 17 and therefore create a protuberance that catches against the edge of the groove. The effective cross-sectional area of the anchor body 11 is larger than that of the bore, except for the grooves, thereby preventing the anchor body from being withdrawn.

Figure 7:
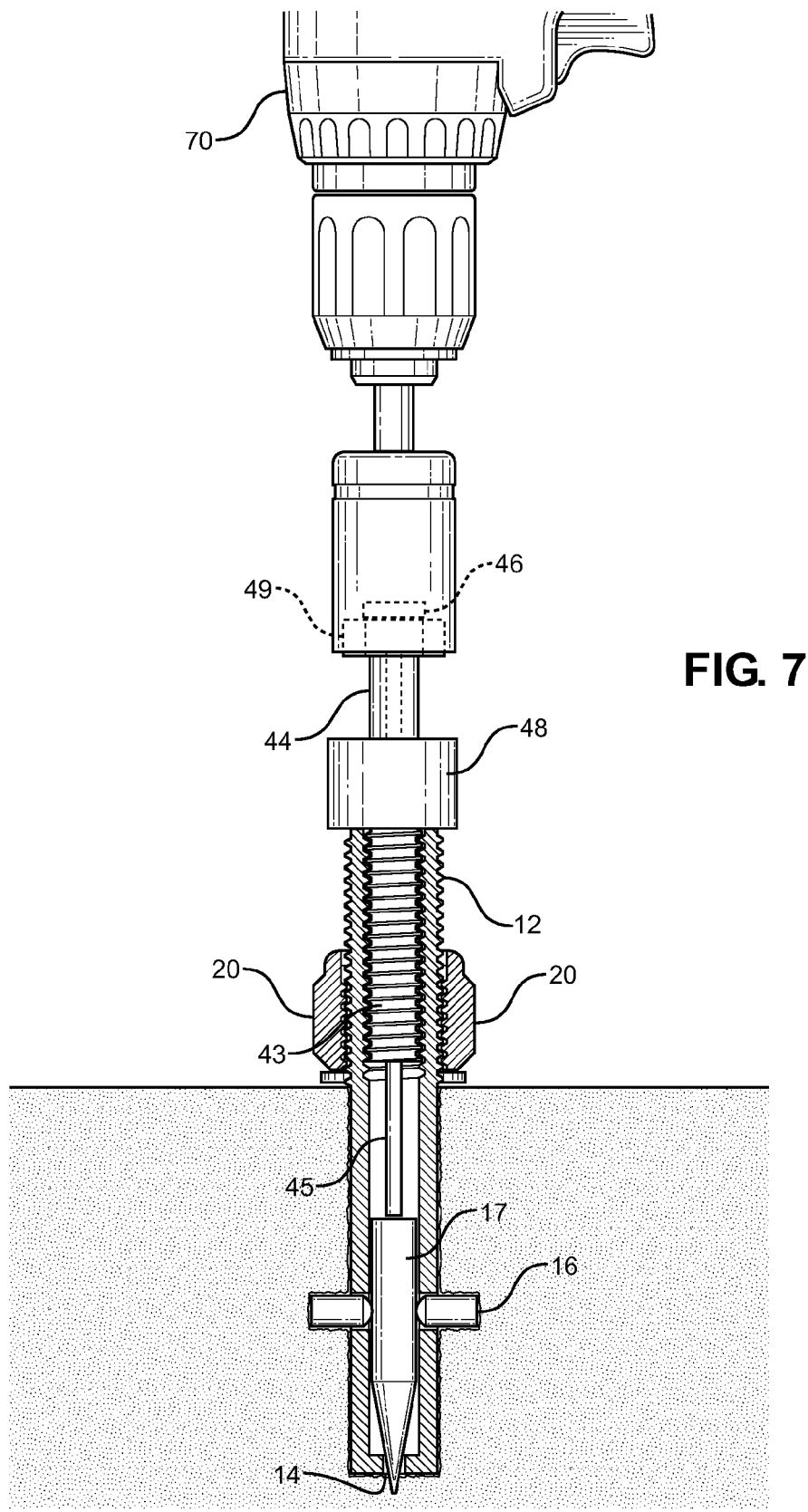
FIG. 7 shows the process of installing the anchor portion with the installation portion using an impact wrench fitted with a deep socket.

Referring now to FIG. 7, there is shown the method of installing the present protrusion anchor assembly. After the anchor body 11 has been placed within the pre-drilled bore, the installation tool 41 is threadably engaged with the internal threading of the upper threaded portion 12 of the anchor body 11. An impact wrench 70 is then used to simultaneously depress the pad 46 of the driver rod 45 so that the terminal end of the driver rod 45 subsequently comes into contact with, and then depresses, the protrusion actuator 17. The tapered end 19 of the protrusion actuator 17 slides under the rounded inner ends of the pins 16 and gradually extends the pins 16 as the cross-sectional area of the tapered end 19 increases. The impact wrench 70 rotates the present protrusion anchor assembly while simultaneously extending the pins 16, as discussed above, because the socket of the impact wrench 70 fits over the pad 46 and engages with the engagement means 49. The engagement means 49 is integrally connected to the rest of the present protrusion anchor assembly and thus the impact wrench 70 is able to rotate the entire assembly. The pins 16 are therefore extended while at the same time rotated, which carves shelves in the surrounding bore for the pins 16 to rest in and act as protuberances preventing the anchor body 11 from being withdrawn from the bore.

Figure 8:
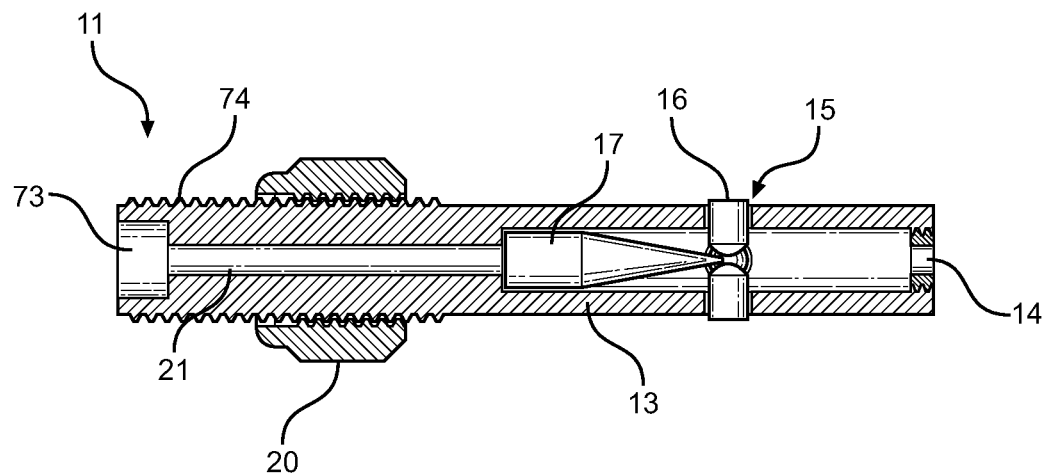
FIG. 8 shows a cross-sectional view of an alternate embodiment of the anchor portion of the present protrusion anchor assembly.
Figure 9:
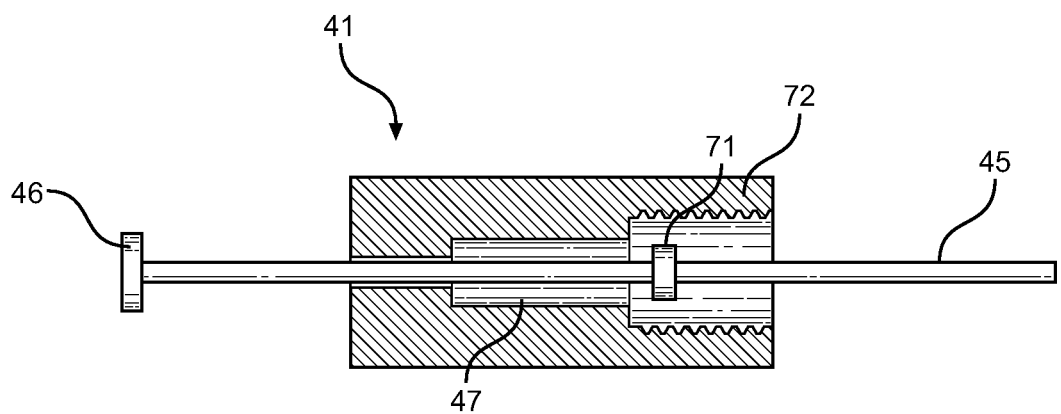
FIG. 9 shows a cross-sectional view of an alternate embodiment of the installation portion of the present protrusion anchor assembly.

Referring now to FIGS. 8 and 9, there is shown an alternate embodiment of the present protrusion anchor assembly. The anchor body 11 of this embodiment has only an anchor external threading 74 portion, rather than both external and internal threading as in the previously described embodiments. Furthermore, the internal bore 21 has an initial smaller diameter and then steps up to a larger diameter as the internal bore 21 extends towards the terminal end of the anchor body 11, near the end cap hole 14 at the lower portion 13. The larger diameter is designed to tightly house the protrusion actuator 17, while still allowing it to slide up and down the channel. This embodiment otherwise has all of the same other structural features of the anchor body 11 described above, including a jamb nut 20 threadably secured along the exterior of the anchor body 11 and a plurality of pins 16 extending through anchor holes 15. A single aligned row of pins 16 is shown in the depicted embodiment, but the present disclosure contemplates the inclusion of multiple rows of aligned pins 16 for carving multiple support shelves into the surrounding bore.

The installation portion of the alternate embodiment of the present protrusion anchor assembly is designed to have a tool internal threading 72 portion, rather than external threading as disclosed in the prior embodiments. The internal threading 72 of the anchor installation tool 41 engages with the external threading 74 of the anchor body 11 portion, rather than having external threading that engages with internal threading on the anchor body 11 as previously disclosed. This embodiment increases the retention strength of the present protrusion anchor assembly because it eliminates the need for dual-sided threading on the anchor body 11, which is a point of potential structural weakness. The alternate embodiment of the anchor installation tool 41 further has a stop 71 disposed along the length of the internal section of the driver rod 45 preventing the driver rod 45 from being removed from the channel 47. The channel 47 of the alternate embodiment has an initial smaller diameter and then steps up to a larger diameter as the channel 47 extends towards the terminal end of the anchor installation tool 41. The smaller diameter of the channel is smaller than the diameter of the stop 71, thereby preventing the driver rod 45 from being pulled therefrom.

Although the configuration for the alternate embodiment is altered, the method of installing the present protrusion anchor assembly is substantially unchanged. The anchor body 11 is placed within a pre-drilled bore within concrete or another rigid material. The tool internal threading 72 of the anchor installation tool 41 is then threaded onto the anchor external threading 74 of the anchor body 11. The driver rod 45 is then simultaneously depressed and rotated by an impact wrench fitted with a deep socket, or a similarly functioning device. This process depresses the protrusion actuator 17, which in turn extends the pins 16 from the anchor holes 15, while at the same time rotating the entire present assembly. The pins 16 carve out shelves into the surrounding bore, which allows the pins 16 to stay in their fully extended position and act as protuberances preventing the anchor from being withdrawn therefrom. The anchor installation tool 41 is then unthreaded from the anchor body 11 and the jamb nut 20 is then tightened against the concrete face to keep the anchor body 11 in place. The anchor body 11 is then ready to have objects secured to it. The anchor installation tool 41 may be reused to install other anchor body 11 portions.

Overall, the device serves as an alternative to previous expansible fasteners intended to be used in concrete or other hard, rigid material, wherein the present invention provides a plurality of protrusion pins that carve a groove or grooves into the surrounding concrete bore in order to secure the anchor body. The anchor body cannot subsequently be removed from the bore because the pins act as protuberances that catch against the edges of the grooves. The circumferential area of the anchor body, plus the length of the pins, is larger than the area of the bore, thereby preventing the anchor from being drawn through the bore and thus securing the anchor in place within the bore.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A protrusion anchor fastener, comprising:
   an anchor body having an upper threaded portion and a lower portion;
   said lower portion having an end cap hole at its terminal end and a plurality of anchor holes;
   said anchor body having an internal bore extending therethrough;
   a protrusion actuator having a driver end and a tapered end;
   a plurality of pins having an inner rounded end and an outer end, said pins adapted to be pushed through said anchor holes by said protrusion actuator and engage with surrounding material as said protrusion actuator is depressed;
   a jamb nut adapted to engage with said upper threaded portion and secure said anchor body against a concrete surface;
   a security plug having an elongated rod portion and a threaded plug portion adapted to engage with said upper threaded portion.

2. The protrusion concrete anchor of claim 1, wherein said upper threaded portion has an external thread and an internal thread; and wherein said security plug is adapted to engage with said internal thread.

3. The protrusion concrete anchor of claim 1, wherein said anchor holes are radially spaced 90 degrees apart.

4. A protrusion anchor installation tool, comprising:
   a driver rod with a pad;
   a body portion having an upper tool portion and a lower tool threaded portion;
   said body portion having a channel through which said driver rod is inserted;
   said lower tool threaded portion adapted to engage with said upper threaded portion and be secured thereto;
   said driver rod adapted to push said protrusion actuator through said internal bore;
   said upper tool portion having an engagement means.

5. A protrusion anchor assembly, comprising:
   an anchor body having an upper threaded portion and a lower portion;
   said lower portion having an end cap hole at its terminal end and a plurality of anchor holes;
   said anchor body having an internal bore extending therethrough;
   a protrusion actuator having a driver end and a tapered end;
   a plurality of pins having an inner rounded end and an outer end, said pins adapted to be pushed through said anchor holes by said protrusion actuator and engage with surrounding material as said protrusion actuator is depressed;
   a jamb nut adapted to engage with said upper threaded portion and secure said anchor body against a concrete surface;
   an anchor installation tool having a driver rod with a pad and a body portion having an upper tool portion and a lower tool threaded portion;
   said body portion having a channel through which said driver rod is inserted;
   said lower tool threaded portion adapted to engage with said upper threaded portion and be secured thereto;
   said driver rod adapted to push said protrusion actuator through said internal bore;
   said upper tool portion having an engagement means.

6. The protrusion anchor assembly of claim 5, wherein said upper threaded portion has an external thread and an internal thread.

7. The protrusion concrete anchor of claim 6, further comprising a security plug having an elongated rod portion and a threaded plug portion adapted to engage with said internal thread.

8. The protrusion concrete anchor assembly of claim 6, wherein said anchor holes are radially spaced 90 degrees apart.

9. The protrusion concrete anchor assembly of claim 5, further comprising a security plug having an elongated rod portion and a threaded plug portion adapted to engage with said upper threaded portion.

10. The protrusion concrete anchor assembly of claim 5, wherein said anchor holes are radially spaced 90 degrees apart.

* * * * *